March 5, 1929.  F. H. JOHNSON  1,704,612
AIRCRAFT FLOTATION DEVICE
Filed April 12, 1927  2 Sheets-Sheet 2
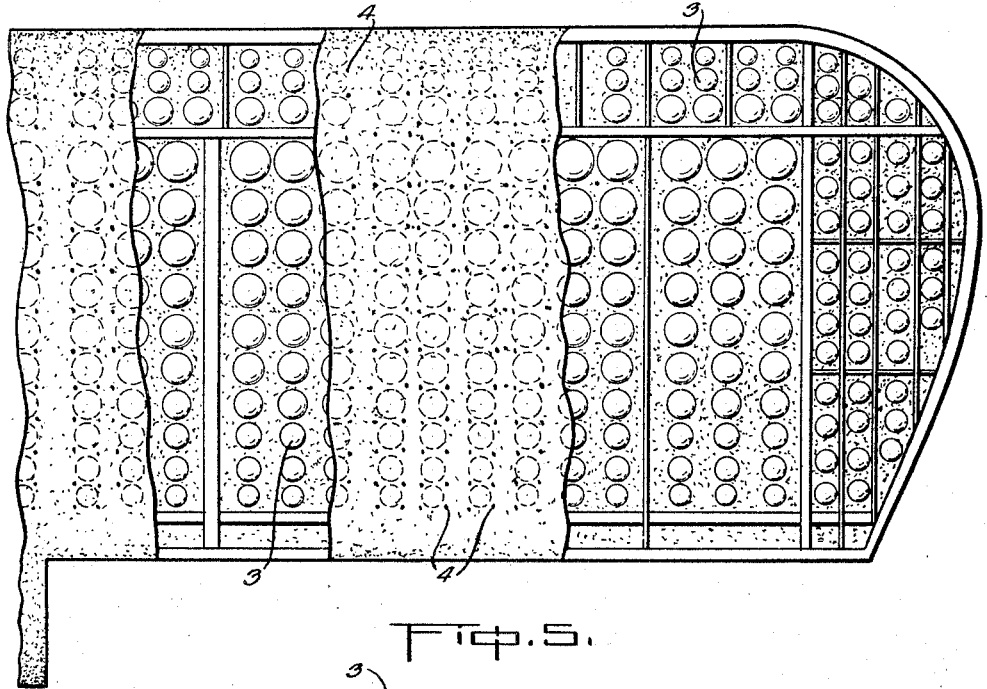
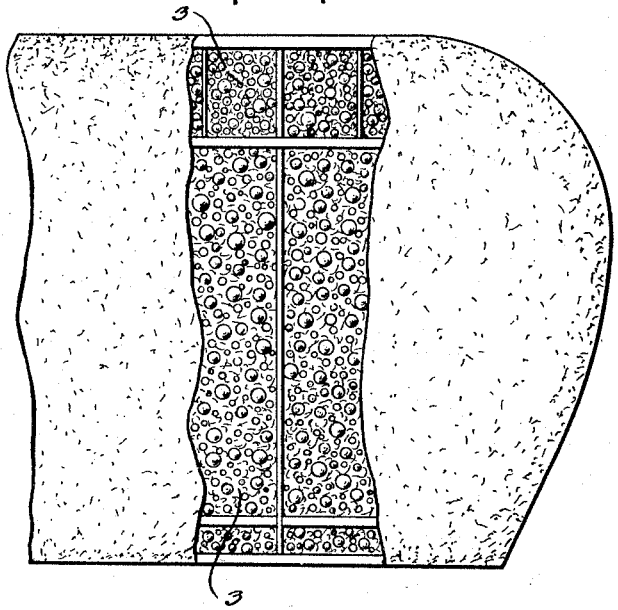
INVENTOR
FREDERICK H. JOHNSON.

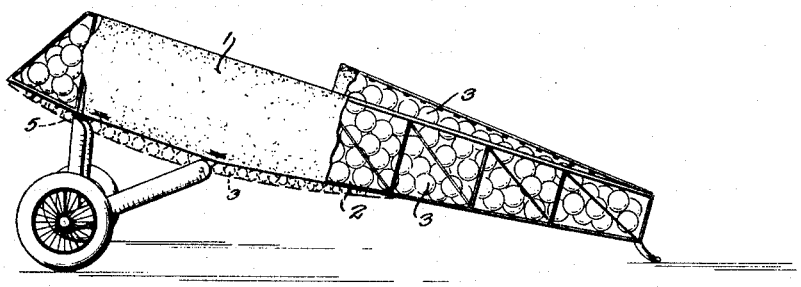
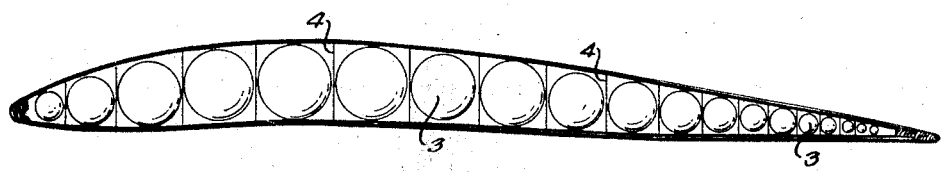
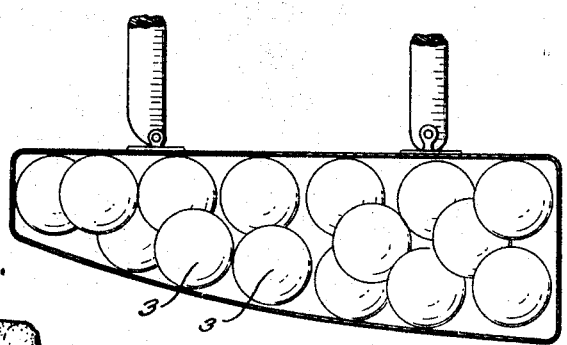
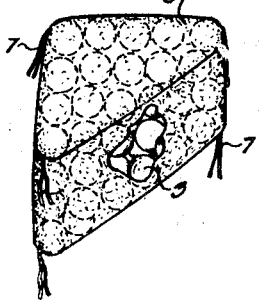

Patented Mar. 5, 1929.

1,704,612

UNITED STATES PATENT OFFICE.

FREDERICK HOSMER JOHNSON, OF KENMORE, NEW YORK.

AIRCRAFT FLOTATION DEVICE.

Application filed April 12, 1927. Serial No. 183,121.

My invention relates to improvements in aircraft structures and the object of my invention is to permanently render all types of aircraft water bouyont, and so overcome the drowning hazard which constantly menaces pilots which may be forced in an emergency to alight upon water. My invention particularly relates to aeroplanes which are not designed to alight upon the surface of water, but is also very applicable to sea planes which of course are provided with pontoons to sustain the machine upon the surface, but if one or more of the pontoons, upon the side of the machine become damaged through a forced landing being made, or through other causes, the machine is very apt to turn turtle with the great possibility of loss of the crew.

Another object of my invention which consists of providing a multiplicity of gas or air containing balloons or bubbles in suitable places in the interior of the wings and fuselage, also interiorly of the pontoons in sea going craft, is to utilize these bubbles which may be of conglomerate form and adhere to the inner surfaces of the fabric as a means for preventing the fabric from ripping and bursting open to a great extent should the machine suffer from anti-aircraft fire, or the fabric torn through any unforeseen cause.

A still further object of my invention is to inflate the balloons or form the conglomerate bubbles by means of flame extinguishing gas and so decrease to a great extent the fire hazard which is ever present when gasoline is used, and another object of my invention is to utilize the conglomerate bubbles, the skin of which is designed to set after they are injected into the different parts of the machine, as a means for coating the inner faces of the fabric, beams, struts, etc., and so prevent the accumulation of moisture within the wings and fuselage which so often unnoticeably deteriorates the structure and seriously weakens the machine.

My invention consists of an aircraft flotation means constructed and arranged all as hereinafter more particularly described and illustrated in the accompanying drawings in which, Figure 1 is a side elevational view of an aeroplane fuselage, part of the fabric being broken away to disclose my balloons or bubbles positioned within the waste spaces.

Figure 2 is an enlarged cross sectional view through an aeroplane wing showing balloons positioned therein.

Figure 3 is a longitudinal sectional view through a pontoon showing my balloons positioned therein.

Figure 4 is a plan view of a fragmentary portion of an aeroplane wing, part of the fabric being broken away to disclosed the flotation balloons.

Figure 5 is a similar view to Figure 4, a conglomerate mass of bubbles being shown positioned in the wing instead of the individual balloons illustrated in Figure 4, and Figure 6 is an enlarged perspective view of one of a plurality of balloon or bubble containing fabric cases which may be attached interiorly of the body structure.

Like characters of reference indicate corresponding parts in the different views.

I do not propose to particularly identify the respective aeroplane parts; as my invention can with equal facility be used in any type of aircraft, whether of the lighter than air or heavier than air type, and the drawings only illustrate the standard parts of most heavier than air machines.

1 is an aircraft fuselage, the portion 2 which extends from the cockpit to the tail is generally considered waste space and can be very readily adapted to contain my balloons or bubbles which I have indicated throughout the drawings by numeral 3. When individual balloons are used they are constructed of high grade air proof rubber which will permit them to remain inflated with gas or air for long periods, and these balloons are suitably positioned within the fuselage so that they fill every convenient space but do not interfere with the control cables which pass therethrough.

If upon the other hand conglomerate bubbles are used, such bubbles are formed after the manner of conglomerate soap bubbles from a warm solution having as its base rubber or some similar substance. These conglomerate bubbles can be made in a simply constructed bubble forming device and passed therefrom whilst in a moist state into the aircraft where they will properly set. To prevent the conglomerate bubble mass from interfering with the control cables it is necessary to either work the cables to and fro so that they free themselves when the mass is setting or to encase them within lengths of tubing around which the bubble mass will set.

Referring to Figures 2 and 4 which show balloons positioned within the wings, it will be observed that the balloons vary in diameter to conform with the wing contour, thus the balloons positioned in the vicinity of the entering and trailing edges are small whilst the balloons positioned centrally of the wing are comparatively large. For preventing the expansion of the balloons at high altitudes from disturbing the plane surfaces I join the upper and lower fabrics of the wing by means of vertical stitches or tapes 4, which are suitably positioned and answer the dual purpose of retaining the contour of the wing surfaces and keeping the balloons in their adjusted positions. It will also be appreciated that should the aircraft wings become smashed and broken open when a forced landing is made upon the water that the fabric stitches or tapes will retain the balloons in place and prevent them from escaping and floating away.

Where the conglomerate bubble mass is forced into the wings as illustrated in Figure 5 it will generally be necessary to position suitable forms or clamps temporarily about the wings for reinforcing the fabric against internal pressure when the conglomerate mass is being injected. As soon as the bubble mass is set these forms or clamps can be removed, and it will be understood that it will also be necessary to operate the control cables whilst the mass is setting to prevent it from clinging to them, or provide tubes to contain the cables.

The pontoons for sea planes can be also designed to contain bubbles or balloons to great advantage, as any failure of the pontoon skin or structure arising from accident, will not impair the buoyancy thereof, as is now the case, but it will retain buoyancy through the medium of my device.

Upon reference to Figure 1 it will be seen that I have provided an auxiliary balloon or bubble containing member 5, shown in dotted lines, upon the under side of the forward portion of the fuselage in the vicinity of the center of gravity of the machine, the provision of this member will insure the buoyancy of the machine at its heaviest part and will in some cases be found a very desirable addition. It will be readily understood that balloon or bubble containing members of this type can be readily attached to different portions of the machine and as they will in most cases necessarily have to conform with the curvature of the structure to which they are attached, I consider them a part thereof.

Attention is drawn to Figure 6 wherein balloons or bubbles are shown in a fabric casing 6, casings of this type can be constructed of any shape to conform with vacant spaces in the interior of the machine and can be readily attached thereto by any suitable means such as the tapes 7 which are secured to the corners of the case and adapted to be attached to the frame members or other suitable parts of the body. It will be appreciated that by furnishing balloons or bubble containing fabric cases of suitable sizes and shapes that they can be readily used to render any existing aircraft water buoyant without taking the machine out of commission for a long period or going to a great expense.

When my bubbles or balloons are filled with a flame extinguishing gas, they add in a great measure to the safety of the pilot or crew as the flame if not entirely extinguished by the gas in the balloons or bubbles, will in many cases be held in check and so permit the pilot to make a safe landing.

From the foregoing description it will be very readily appreciated that I have devised a means for rendering all types of aircraft water buoyant without increasing the weight or cost of manufacture to an undue degree and whilst I have illustrated and described only certain specific embodiments of my invention, I realize that it is susceptable of many variations bringing about the same result and that the principle thereof may be embodied in many different forms.

What I claim as my invention is:

1. A water flotation device for aircraft comprising a gas containing foam positioned interiorly of the body of the machine.

2. A water flotation device for aircraft comprising a conglomerate mass of gas containing foam positioned interiorly of the machine.

3. A water flotation device for aircraft of the heavier than air type comprising a conglomerate mass of gas containing bubbles positioned interiorly of the fuselage and wings of the machine.

4. A water flotation device for aircraft comprising a plurality of flame extinguishing gas containing bubbles positioned interiorly of the body of the machine.

5. A water flotation device for aircraft comprising a conglomerate mass of flame extinguishing gas containing bubbles positioned interiorly of the machine.

FREDERICK HOSMER JOHNSON.